US009690795B1

(12) United States Patent
McGrath

(10) Patent No.: US 9,690,795 B1
(45) Date of Patent: Jun. 27, 2017

(54) DATA REPOSITORY CONFIGURED FOR FACILITATING POINT IN TIME RETRIEVAL OF CONTENT

(71) Applicant: Propylon, Inc, Lawrence, KS (US)

(72) Inventor: Sean McGrath, Lawrence, KS (US)

(*) Notice: Subject to any disclaimer, the term of this patent is extended or adjusted under 35 U.S.C. 154(b) by 136 days.

(21) Appl. No.: 13/956,253

(22) Filed: Jul. 31, 2013

Related U.S. Application Data

(60) Provisional application No. 61/681,224, filed on Aug. 9, 2012.

(51) Int. Cl.
*G06F 17/30* (2006.01)

(52) U.S. Cl.
CPC .................. *G06F 17/301* (2013.01)

(58) Field of Classification Search
CPC ..................................... G06F 17/301
USPC ............................................. 707/705
See application file for complete search history.

(56) References Cited

U.S. PATENT DOCUMENTS

| 8,868,506 B1* | 10/2014 | Bhargava | G06F 17/30011 707/648 |
| 2002/0169658 A1* | 11/2002 | Adler | 705/10 |
| 2004/0139116 A1* | 7/2004 | Porter | 707/104.1 |
| 2006/0218305 A1* | 9/2006 | Kinnan | G06F 17/30902 709/246 |
| 2007/0143363 A1* | 6/2007 | Agarwal et al. | 707/203 |
| 2008/0104140 A1* | 5/2008 | Vierich et al. | 707/202 |
| 2009/0083268 A1* | 3/2009 | Coqueret et al. | 707/6 |
| 2012/0254687 A1* | 10/2012 | Leggette | H04L 9/085 714/763 |

OTHER PUBLICATIONS

Propylon, Legal & Regulatory Management System, Jul. 20, 2011, pp. 1-3, https://web.archive.org/web/20110720144338/http://www.propylon.com/index.php/technology/lrms.*
Propylon, TimeArc, Jul. 20, 2011, pp. 1-2, https://web.archive.org/web/20110720144052/http://www.propylon.com/index.php/technology/timearc.*
Legislative Workbench (LWB) Technical White Paper Version 1.0; 2012.
Legal and Regulatory Management System datasheet; Jul. 27, 2010.
Screenshot of Legislative Workbench dataed Sep. 25, 2012.

* cited by examiner

*Primary Examiner* — Fred I Ehichioya
*Assistant Examiner* — Johnese Johnson
(74) *Attorney, Agent, or Firm* — Martensen IP; Michael C. Martensen

(57) ABSTRACT

A data repository configured for storing original content and modified content which are addressable for point-in-time retrieval thereof. The data repository comprising one or more digital files which are associated with the original content. A log is provided which records actions implemented on the one or more of the digital files. A versioned repository is generated after an action is implemented on the one or more digital files. The versioned repository comprising one or more modified digital files which are associated with the modified content. A version identifier is associated with the versioned repository for facilitating point in time retrieval thereof.

23 Claims, 8 Drawing Sheets

DATA REPOSITORY CONFIGURED FOR FACILITATING POINT IN TIME RETRIEVAL OF CONTENT

FIELD OF THE INVENTION

The present invention relates generally to a data repository configured for facilitating authentication of original content. More particularly, the present teaching relates to a data repository configured for storing original content and modified content which are addressable for point-in-time retrieval thereof.

BACKGROUND

An ever-increasing amount of digital content is created and consumed entirely electronically without ever existing in a traditional paper form. The cost savings that come from digital documents are very significant but there are drawbacks with paperless systems. In particular, material that has legal or paralegal status presents significant challenges in a fully digital environment because of the legal weight associated with physical (typically paper-based) manifestations of critical documents such as laws, contracts, testimony etc. Individual laws in United States are printed on paper and signed in ink, in person, by a senior elected official (e.g. a Governor) with various witnesses present. Typically a set number of originals are signed by the official at a signing ceremony and the copies are distributed to various locations for safe keeping. Typical destinations for these signed originals include the secretary of state's office, the state library, the governor's office, the legislature and the supreme court. Parliaments in United Kingdom and Ireland have similar systems in which laws are printed on special paper known as "vellum" and signed by a head of state. In Ireland for example, laws are signed on vellum by the president, using non-fugitive ink, with witnesses present and each page of each law is initialised. Contract documents are printed and signed in ink, in person with various witnesses present. Signed original copies are then typically kept by each party to the contract. In tort cases for example, the original signed contracts are admissible evidence in courts of law. Documents to be used in formal legal settings such as passport application forms are witnessed, signed in ink and stamped by legally empowered individuals known as notaries. Much of the current legal infrastructure in the world is built on this physical-centric model of authenticity.

The physical originals which are signed and witnessed may be referred to as having a 'first order authenticity'. The term 'first order authenticity' refers to the true original document by virtue of existing in a tamper evident physical form, created with all the necessary witnessing/notarizing required to meet relevant legal requirements. A copy of an original document has a 'second order authenticity'. The term 'second order authenticity' refers to the mass-produced copies of first order authentic documents. A second order document is a near replica of a first order authentic target document. The fidelity of the replica is >=0% and <100%. In other words, a second-order authentic document may have no relationship whatsoever to the original (a 0% authentic copy). It might have a very high relationship to the original, but the degree of match will always remain less than 100%. If the match was exactly 100%, then the document would have first order authenticity because it would be completely indistinguishable from the first order authentic target.

From the earliest days of written legal materials, great lengths have been taken to ensure that first order authentic material could be differentiated from the second order authentic materials i.e. ensuring that the second order authenticity would always remain <100% of the first-order authentic target so that forgeries could be detected.

As technology has evolved, the dualism between first order authentic legal materials and second order legal materials has remained. Today, the day-to-day practical use of both is a complex mix of government mandate, private business pragmatism, social convention and legal precedent. Today, social constructs and pragmatic business conventions have been institutionalized to deal with the inherent risk that a digital document with only second order authenticity may not be accurate enough for the purpose at hand. Government agencies have been created to create high quality legal materials with second order authenticity.

Today, the vast majority of second-order authentic legal materials are accessed/distributed electronically. This may be viewed as a more efficient alternative to the previous methods of creating mass copies such as paper based print runs or micro-fiches. The digital world adds nothing new here in the sense that the legal world has long established methods for dealing with the risks inherent in second order authenticity of legal materials. Electronic forms of such legal materials are simply the latest manifestation of the second order authenticity phenomenon which has been around ever since copies were made possible by the invention of clay tablets, paper etc.

However, law makers, courts, government agencies and other generators of first order legal materials are coming under increasing pressure (financial and cultural) to "go paperless" completely. This raises significant challenges for a digital document to have first order authenticity. Without signed/witnesses master paper copies on some physical medium, how can first order authentic digital materials be differentiated from second order copies, given that purely digital copy operations are bit-for-bit perfect replicas of the source? One of the challenges encountered is how can a digital document be authenticated. In particular, how can the time honoured and legally binding concepts of signing and witnessing be implemented in a purely digital world?

The problem has become more pressing with Web 2.0 and the Semantic Web as there is an increasing number of third order, fourth order and fifth order authentic materials appearing as content is repurposed, repackaged, transformed, aggregated on search engines, blogs, etc. With each layer of content transformation and repurposing, the differences between the original and the copy get more and more pronounced and questions of authenticity become more complicated to determine.

There is therefore a need for a data repository configured for facilitating authenticating digital content by simultaneously providing original content and modified content which are addressable for point-in-time retrieval.

SUMMARY

These and other problems are addressed by the provision of a data repository configured for storing original content and modified content which are addressable for point-in-time retrieval thereof.

In one embodiment there is provided a data repository having original content and modified content which are addressable for point-in-time retrieval thereof; the data repository comprising:

one or more digital files which are associated with the original content;

a log detailing actions implemented on the one or more of the digital files;

a versioned repository being generated after an action is implemented on the one or more digital files; the versioned repository comprising one or more modified digital files which are associated with the modified content; and a version identifier being associated with the versioned repository for facilitating point in time retrieval thereof.

Advantageously, the log includes time data. Preferably, the log includes a timeline. Ideally, the log includes biographic data of an editor. In one example, the log includes biographic data of a plurality of editors. Preferably, the biographic data includes at least one of a name, title, professional qualification, role and address. Ideally, the log is tabulated.

In one embodiment, the repository is part of a geographic information software application. Ideally, the one or more digital files include a base map and a plurality of associated digital files. In another example, the repository is part of an accounting software application. Advantageously, the one or more digital files include a plurality of inter-related spreadsheets. In another example, the repository is part of a word processing software application. Preferably, the one or more digital files comprise a plurality of inter-related word processor documents. Ideally, the versioned repository has an associated time stamp.

In another embodiment, the repository forms part of a web application. Advantageously, the repository is in a format suitable for publishing on the internet. Ideally, the versioned repository has an associated hyperlink address for facilitating retrieval thereof via the internet.

Advantageously, the actions include at least one of updating, deleting, editing, and creating.

The present teaching is also directed to an article of manufacture, comprising: a computer readable storage medium having machine readable instructions embodied thereon which, when executed by a processor, cause the processor to provide a data repository comprising:

one or more digital files with associated content;

a log detailing actions implemented on the one or more of the digital files;

a versioned repository being generated after an action is implemented on the one or more digital files; the versioned repository comprising one or more modified digital files; and a version identifier being associated with the versioned repository for facilitating point in time retrieval thereof.

The present teaching further relates to a method of creating a data repository, the method comprising:

providing one or more digital files with associated content;

providing a log detailing actions implemented on the one or more of the digital files;

generating a versioned repository when an action is implemented on the one or more digital files; the versioned repository comprising one or more modified digital files;

providing a version identifier associated with the versioned repository for facilitating point in time retrieval thereof; and storing the versioned repository.

In one exemplary aspect there is provided a digital data record which comprises:

a primary file having primary content;

at least one secondary file having secondary content, wherein the secondary content is related to the primary content; and a log detailing actions associated with the primary file and the least one secondary file.

In an exemplary aspect, a plurality of secondary files are provided. Optionally, each secondary file has an associated version identifier. Preferably, each secondary file is retrievable using the associated version identifier. Ideally, a workflow is provided comprising a plurality of editing steps. Ideally, the workflow details each editing step from the creation of the primary file to a final secondary file related to the primary file.

In a further exemplary aspect, the digital data record is in a format compatible for publishing on the internet. Ideally, the digital data record is in a format compatible for storing on a storage medium. Preferably, the digital data record is in a format compatible for displaying using a web browser.

In another exemplary aspect, the primary file has an associated hyperlink address for facilitating retrieval thereof via the internet. Ideally, each secondary file has an associated hyperlink address for facilitating retrieval thereof via the internet.

In one exemplary aspect, the primary file comprises metadata. Advantageously, the at least one secondary file comprises metadata. Preferably, the primary file comprises machine readable data. Optionally, the at least one secondary file comprises machine readable data. Preferably, the log includes machine readable data. Advantageously, the log includes metadata.

In a further exemplary aspect, the log includes chronological data associated with the primary file. Advantageously, the log includes chronological data associated with the at least one secondary file.

Advantageously, the primary file comprises a primary corpora. Ideally, the at least one secondary file comprises a secondary corpora related to the primary corpora.

Preferably, the secondary content is semantically related to the first content.

These and other features will be better understood with reference to the followings Figures which are provided to assist in an understanding of the teaching of the invention.

BRIEF DESCRIPTION

The present invention relates generally to a data repository configured for facilitating authentication of original content. More particularly, the present teaching relates to a data repository configured for storing original content and modified content which are addressable for point-in-time retrieval thereof. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

The present invention will now be described with reference to the accompanying drawings in which.

DETAILED DESCRIPTION OF THE DRAWINGS

The present teaching enables first order authentic digital records, in a digital environment. The teaching places emphasis on comprehensive provenance features as the necessary re-requisite to first order authentic digital records. The term provenance refers to having the complete history of a record and how it came to be in its current state. The present teaching establishes comprehensive provenance as the differentiator between first order and second order authentic records in a digital environment where physical attributes such as ink based signatures or vellum based paper originals are not available.

In the legal field, the term 'chain of custody' is often used to capture the concept of provenance. The term 'chain of custody' is described in the Sedona Conference e-Discovery Glossary, 2010 edition as follows: 'documentation and testimony regarding the possession, movement, handling, and location of evidence from the time it is obtained to the time it is presented in court or otherwise transferred or submitted; used to prove that evidence has not been altered or tampered with in any way; necessary both to assure admissibility and authenticity'.

The present method is concerned with ensuring that digital record management systems have the necessary chain of custody features to allow digital records to be admissible into courts of criminal justice where the burden of proof requirements for evidence are very high.

Although the present teaching focuses on the legal domain, digital provenance has significant applications beyond the field of law such as science. Accordingly, it is not intended to limit the teaching to the legal domain.

Figure 1:
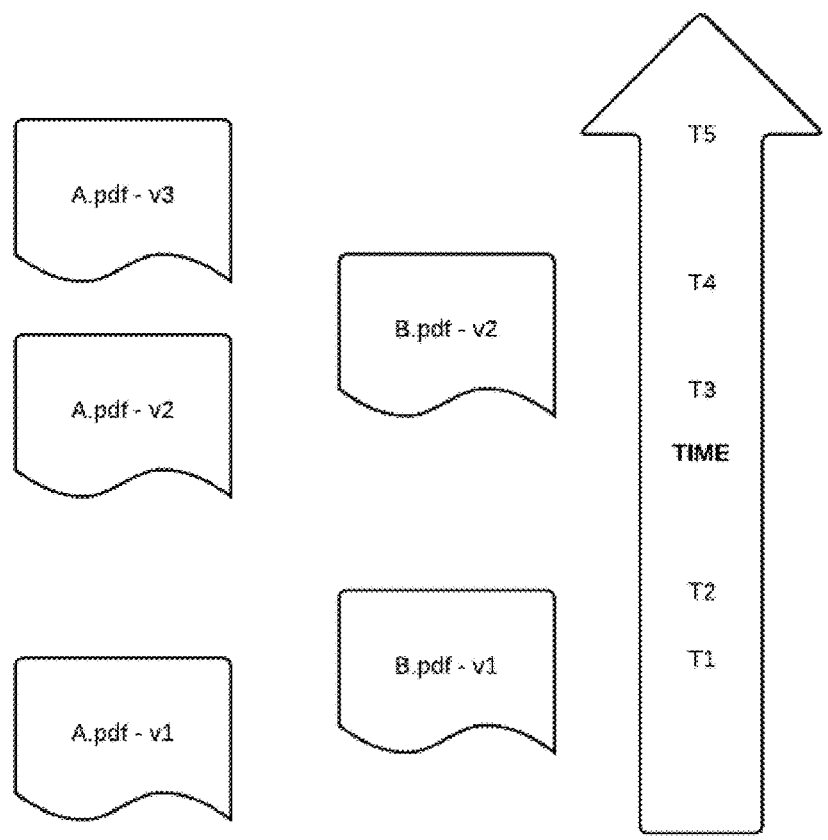
FIG. 1 is a block diagram illustrating a prior art arrangement for managing interrelated digital files.
Figure 2:
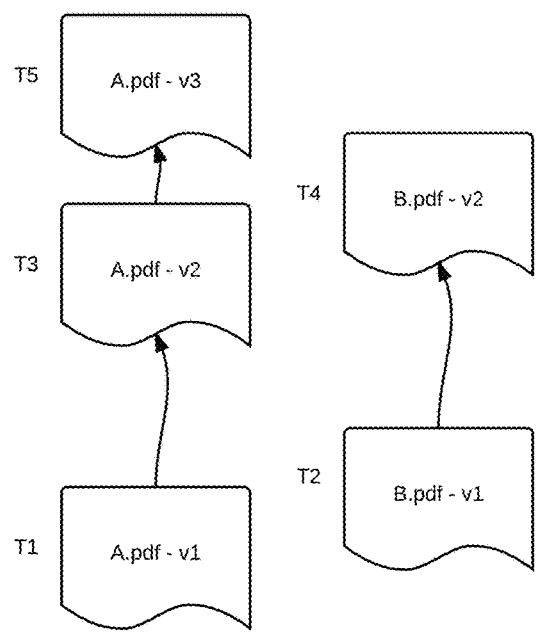
FIG. 2 is a block diagram illustrating a prior art arrangement for managing interrelated digital files.

Today, the standard design for a so called Document Management System (DMS) or Content Management System (CMS) or Record Management System (RMS) treats each digital file as a separate object with its own separate life history as illustrated in FIG. 1. In the example of FIG. 1, there are two digital files in the system, namely, A.pdf and B.pdf. File A.pdf has been versioned three times and file B.pdf has been versioned twice. The system manages the versioning automatically i.e. as files are saved, a new version number is assigned which are indicated by references v1-v3. Previous versions of each file are then available if needed. Each digital file has its own separate version history, independent of any other record as illustrated in FIG. 2.

User Interfaces and application programming interfaces associated with this sort of system will typically have function calls such as:

Retrieve latest version of A.pdf
Retrieve previous version of B.pdf
Retrieve version history of A.pdf As can be seen by the document-by-document nature of the functionality, these sort of systems treat a corpus of content as being simply a collection of independent digital files that each have their own separate life cycles. There are no corpus oriented management operations apart from creating archive bundles, classifying assets into folders etc.

Figure 3:
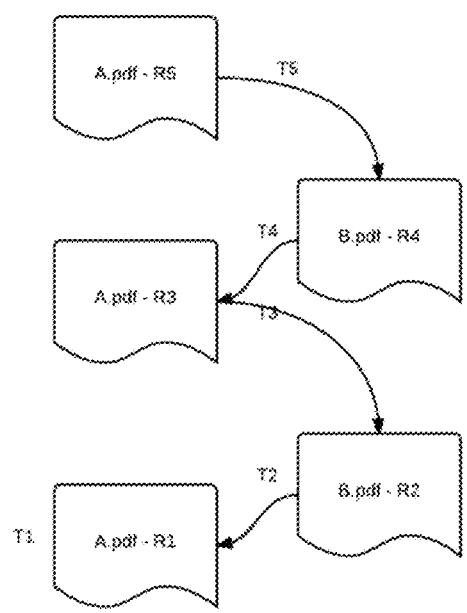
FIG. 3 is a block diagram illustrating a method for managing interrelated digital files in accordance with the present teaching.

The present teaching as illustrated in FIG. 3 provides a corpus centric approach rather than a document centric approach. In other words, the corpus (data repository) as a whole is versioned, rather than individual files. Rather than allocate version numbers to discrete digital assets such as documents, in a corpus-oriented approach, revision numbers are allocated to each change to the corpus. The example of FIG. 3 illustrates the following series of actions:

A.pdf initially created—Revision 1 at time T1
B.pdf initially created—Revision 2 at time T2
A.pdf updated—Revision 3 at time T3
B.pdf updated—Revision 4 at time T4
A.pdf updated—Revision 5 at time T5

A corpus based approach enables the management of corpus-wide provenance data. i.e. rather than be constrained to view the history of each digital file as a separate time-line. The present teaching archives the history of the entire corpus in the digital record and maps how it has evolved over time as illustrated in table 1:

TABLE 1

| Time | Event | Corpus Revision | User |
| --- | --- | --- | --- |
| T1 | A.pdf created | 1 | Joe |
| T2 | B.pdf created | 2 | Pat |
| T3 | A.pdf updated | 3 | Joe |
| T4 | B.pdf updated | 4 | John |
| T5 | A.pdf updated | 5 | Joe |

Each change to a corpus (sometimes referred to as a "patch" or a "delta") can consist of changes to one or more digital files. To keep disk space usage down to manageable levels, the patches/deltas typically consist of machine readable instructions to be followed in order to mutate the corpus from a given start revision number to the next revision number.

In the exemplary arrangement the digital record may be harvested and bundled together to form a single digital entity. A common way to do this is for a build manager to select a corpus revision number and snapshot the contents of the source code corpus at the desired revision number. In the current example, the digital data files that would be extracted and included in the digital data record are as illustrated in table 2:

TABLE 2

| Corpus extract revision number | Contents of extract |
| --- | --- |
| R1 | A.pdf, as it was at time T1 No B.pdf present |
| R2 | A.pdf, as it was at time T1 B.pdf, as it was at time T2 |
| R3 | A.pdf, as it was at time T3 B.pdf, as it was at time T2 |
| R4 | A.pdf, as it was at time T3 B.pdf, as it was at time T4 |
| R5 | A.pdf, as it was at time T5 B.pdf, as it was at time T4 |

The provenance information available here is clearly richer than it is in the classic document-by-document versioning approach of CMS/DMS/RMS systems. Examining the provenance reports provides insight into the exact state of all digital data file in the repository at the time a "build" was made i.e. a particular corpus revision number.

The tamper evidence approach separates the concepts of digital document workflow and "final form" completely. In other words, the origins and history that lead up to the final digital records are ignored, but steps are taken to ensure that the final form can be made "authentic". The authenticity involved here is mathematical in nature. Message Authentication Codes (MAC) is an approach which computes a number that can be used to determine if a digital record is modified after the MAC is generated. Digital signing is an approach which incorporates the use of identity credentials, generally in the form of PKI-based public/private key pairs to encrypt MACs so that consumers can be more confident in the authenticity of the signer. Hardware devices can be used as tamper evident storage layers that automatically compute MACs and provide hardware level protection against tampering.

The corpus management approach has advantages over the document-by-document approach from a provenance perspective as it provides a history of the discrete digital files and their interrelationships. The benefits are particularly relevant when dealing with corpora that feature many thousands of closely inter-related digital documents.

The richer provenance reporting possible with a corpus-based versioning approach, effectively creates an audit-trail analogous to the audit trail concepts in an accounting system. A provenance report for a digital asset in a corpus-based system can be seen as a ledger of transactions that together account for the state of the digital record.

The present method improves on the provenance capabilities of both the standard Document Management system approach and the standard source code management approach. It is complimentary to the use of tamper evidence methods such as MACs and Digital Signatures but rather than hash or sign a final document, the entire provenance can be made part of the tamper evidence protections.

Figure 4:
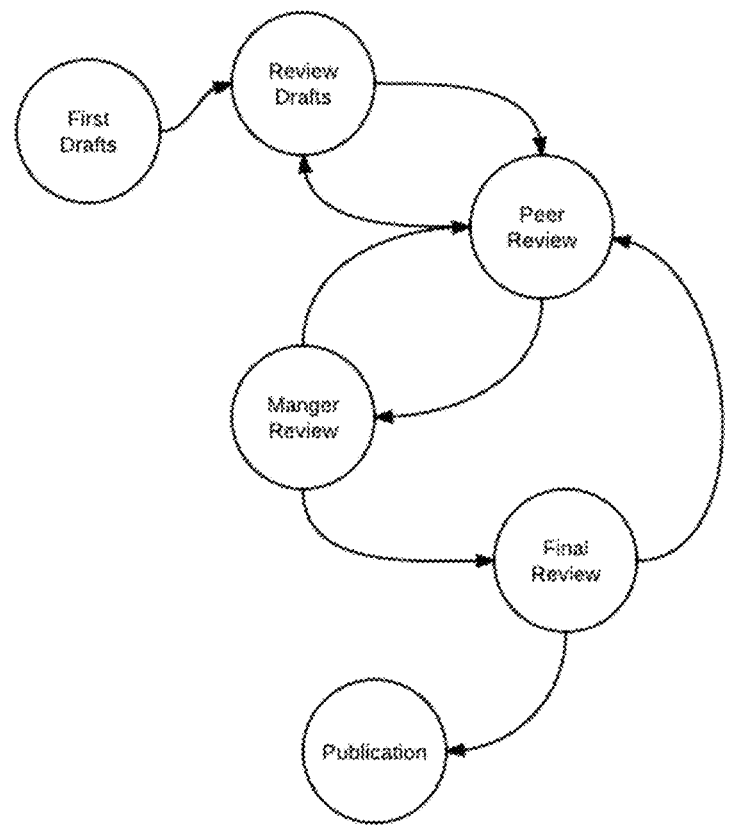
FIG. 4 is a work flow illustrating the steps for creating a data repository in accordance with the present teaching.

In business and legal applications, it is rare for a digital asset to simply be created and published in a single step. Oftentimes, there are elaborate workflows featuring multiple steps and people involved as illustrated in FIG. 4. In the present teaching workflow stages are reified into folder structures in the corpus management system itself. Additionally, workflow state transitions are included. Consider the following simple workflow history. The following workflow steps are provided as illustrated in Table 3:

TABLE 3

| Time | Action |
| --- | --- |
| T1 | B.doc created as a first draft |
| T2 | B.pdf packaged with B.doc and sent for review |
| T3 | Edits made to B.doc by review team. New B.pdf generated and sent to manager review |
| T4 | Edits made to B.doc by manager. New B.pdf generated and sent to final review |
| T5 | B unchanged by final review. B.pdf published. |

The history recorded in these various workflow actions add significantly to the completeness of the provenance picture for the final digital record B.pdf. To record these steps, the concept of a corpus-based approach is extended to include workflow folders and workflow state transitions as follows:

1. Create folders for first_drafts, review_drafts, peer_review, manager_review, final_review and publication.
2. Record all folder actions (creation, deletion, movement, renaming) as part of the revision history.
3. Include all folder information and revision history in the digital record.

An exemplary provenance report of the present teaching is illustrated in table 4:

TABLE 4

| Time | Event | Revision | User |
| --- | --- | --- | --- |
| T1 | /first_draft/b.doc created | 1 | Joe |
| T2 | /first_draft/b.pdf created | 2 | Pat |
| T3 | Copy /first_draft/b.doc to /review_drafts | 3 | Joe |
| T4 | Copy /first_draft/b.pdf to /review_drafts | 4 | Joe |
| T5 | Update /review_drafts/b.doc | 5 | Jane |
| ... | ... | ... | ... |
| T<N> | Copy /final_review/b.pdf /publish | <M> | Joe |

The system stores a complete history of each discrete revision of the repository such that it is easy to determine what every single asset in the repository looked like, at any chosen time point. Furthermore, a complete history of the workflow activity that resulted in each asset in the repository is stored. A complete history of how each asset in the repository has changed over time is also stored. The history data is then included in the final digital record.

A further aspect of the present method adds biographic data of people or entities that contribute to workflows. Examples of personnel and entities may include:
1. authors
2. editors
3. reviewers
4. committees
5. legislative chambers
6. commissions
7. rapporteurs By recording the personnel and entities as digital assets that have their own workflows in the corpus management system, they too become part of the provenance reporting. Adding personnel and entities involves creating folders and digital assets to hold the entities/personnel and their associated metadata. For example, the following may be provided in the present system:

A folder for personnel
Store phone number and employee number with each editor
Store the room number and meeting times for a committee
This allows the provenance reports to contain entries as illustrated in table 5:

TABLE 5

| Time | Event | Revision |
| --- | --- | --- |
| Ta | /committees/finance.odt created | Rn |
| Tb | Update to /committees/finance.odt created | Rm |

TABLE 5-continued

| Time | Event | Revision |
|---|---|---|
| Tc | Move /committees/finance.odt to /committees/tax_review.odt created | Rp |
| Td | Delete /committees/tax_review.odt | Rq |

For example, consider a scenario where one wishes to understand the history relating to a publication produced by a finance committee. From the above provenance report snippet one can see:

That the finance committee was formed at time Ta revision Rn

That the committee was updated at time Tb revision Rm

That the committee was renamed the tax review committee time Tc revision Rp

That the committee was removed at time Td revision Rq

If further information about the history of the committee is required, the contents of the assets involved in revision Rn to Rq can be examined. The contents will typically be metadata items such as committee membership, contact information for people, location information for meetings etc. Having this information in the system answers to questions such as:

Who was on the finance committee the day that xyz.doc passed final review?

What was the official meeting of the tax committee during January of 2010?

Another aspect of the present method is concerned with time aware citations between the various types of digital assets in the corpus management systems:

content documents referencing content documents content documents referencing actors/entities personnel/entities referencing content documents personnel/entities referencing actors/entities Corpus revision numbers provide an efficient mechanism for citing an entire snapshot of the system. By using revision numbers it is possible to effectively lock down the entire state of the system as it was at a particular revision. However, in order to be of practical use, it is necessary to bind the concept of revision history into a referencing/citation infrastructure so that references to revisions and to specific assets and states at particular revisions can be expressed syntactically and used to retrieve information from the system. The present method achieves this by adding revision referencing into the Web URI space for the corpus management system. Simply put, if an asset is named /a/b/d.pdf in the system, then it may be cited as http://www.example.com/a/b/d.pdf and retrieved over HTTP(s). The asset as it was at any historical time point, corresponding to a revision number, can be cited and retrieved by adding a revision number indicator such as: http://www.example.com/a/b/d.pdf/rev/400. A URI without a revision number indicator refers to the asset as it appears at the point the URI is dereferenced. That is, multiple retrievals of the same asset can return different results if the underlying asset changes. Contrast this with URIs that have revision numbers. They are purely idempotent and will always return the same resource. The non-idempotent reference form can also be explicitly made like this for example: http://www.example.com/a/b/d.pdf/rev/-1. Where -1 in the present method means "latest version". The present method of revision based referencing also applies to workflow states. For example, http://www.example.com/first_draft/rev/100 cites all assets that were in the workflow state known as "first_draft" as of revision 100.

This ability to cite digital files in a way that locks down the point in time used is what allows the relationships between documents, personnel and entities to be efficiently expressed and made reliable, even if the digital assets used to express the relationships change over time. Moreover, basing the citation on a URI scheme allows compliant systems to be navigated via a standard web browser using hyperlinks.

Finally, by manipulating a viewer's concept of "current revision number", it is possible to create a navigation experience for users that allows seamless traversal of hyperlinks whilst keeping the point in time fixed. i.e. having accessed digital file X as it was at revision R, any hyperlinks contained within X can be traversed as if they were citing digital assets at revision R. The net result of this is that the user finds themselves placed at a point in time and then navigating between digital files, seeing what they looked like at that point in time.

Another aspect of the present method is concerned with allowing workflow and status reporting to happen simultaneously with update activities without requiring locks, or semaphors or mutual exclusion zones. To see how this operates and the advantages it brings, consider a reporting module that needs to return a table of all assets in the "first_draft" workflow state. For example a sequence of events as is illustrated in table 6.

TABLE 6

| Time | Event | Revision |
|---|---|---|
| T1 | Folder /first_draft created | R1 |
| T2 | /first_draft/a.pdf created | R2 |
| T3 | /first_draft/b.pdf created | R3 |
| T4 | /first_draft/c.pdf created | R4 |
| T5 | /first_draft/b.pdf deleted | R5 |
| T6 | /first_draft/a.pdf updated | R6 |

In pseudo-code, the general form of the reporting algorithm is this: Note the current date/time and create a header for the report with it i.e. "Report as of DDMMYY HH:MM"
Get a list of all assets in first_draft/folder (QUERY 1)
For each asset found:
  Get the asset: (QUERY 2)
  Add line to report about the asset
  Print summary line to the report
  For illustrative purposes, imagine a scenario where T1, T2 . . . T6 are 1 second apart and it takes 1 second to run each query.
    If QUERY 1 happens between T1 and T2, no assets are returned.
    If QUERY 1 happens between T2 and T3, 1 asset is returned (a.pdf).
    If QUERY 1 happens between T3 and T4, 2 asset is returned (a.pdf, b.odf).
    If QUERY 1 happens between T4 and T5, 3 asset are returned (a.pdf, b.pdf, c.pdf).
    Note that if QUERY 1 happens between T4 and T5 and 3 assets is returned (a.pdf, b.pdf, c.pdf), the asset b.pdf will not be in the repository by the time QUERY 2 happens some seconds later. The standard approach to dealing with this problem in Computer Science is called locking. Simply put, updates to the system are put on hold so as to ensure that the report processing cannot be effected by update activity. In pseudo-code form:

Lock first_draft folder
Note the current date/time and create a header for the report with it i.e. "Report as of DDMMYY HH:MM"
    Get a list of all assets in first_draft/folder (QUERY 1)
    For each asset found:
    Get the asset: (QUERY 2)
    Add line to report about the asset
    Unlock the first_draft/folder
    Print summary line to the report The problems with locking are many and are well known. They cause blocking. i.e. some threads/processes have to wait for locks to be released. Furthermore, they add overhead for each access to a resource. Additionally, they can be vulnerable to failures and faults that are often very subtle and may be difficult to reproduce reliably. They are prone to deadlock situations e.g. where process A has lock 1 and is waiting to acquire lock 2. But process B has lock 2 and is waiting to acquire lock 1.

Locking is particularly problematic in a distributed system where unavoidable latencies and communications failures dramatically increase the chances of lock-related problems manifesting themselves. The present method circumvents the locking problems. It does this by leveraging the fact that all update operations (asset creations, updates, moves, deletes) are recorded and the system has a cumulative provenance record of all that activity. When an asset is moved or updated or deleted, it remains in the system at the relevant source revisions, even if it is removed in some future revision. The present system uses this cumulative revision concept to "freeze" the view of the corpus for reporting purposes. The above report looks like this in pseudo code form:

Retrieve Current Revision Number R
    Retrieve the time associated with Revision Number R and print a header for the report using the DDMMYY HH:MM associated with Revision R
    Get a list of all assets in first_draft/folder as it looked at Revision R
    (QUERY 1)
    For each asset found:
      Get the asset as it looked at Revision R: (QUERY 2)
      Add line to report about the asset
    Print summary line to the report Updates can continue uninterrupted while any number of reporting functions are going on simultaneously. No locks are required. Every report produced is guaranteed to be self-consistent because it reflects the contents of the system at a specified point in time (the revision number). Note also that the report uses the time-stamp for the revision number.

A further aspect of the present method is concerned with the performance of corpus management systems. In general, there are significantly more requests to query a corpus management system than there are requests to update it. This is especially true at web scale where the number of potential users querying/viewing the repository is orders of magnitude larger than the number of potential users updating it. With the present method, queries performed with respect to a given revision number are fully idempotent. In other words, they can be cached without any need for expiry. This has significant performance advantages at Web scale. The use of revision-based URIs allows present system to leverage well developed caching machinery of HTTP to cache queries.

A further aspect of the present method is concerned with making it possible to use workflow provenance as the basis for a machine readable data format/serialization of corpus management systems.

Each revision is represented on a single line of the 7-bit clean, pure ASCII text file
Each line is a well formed JSON dictionary
Keys in the outer level dictionary are standardized:
    revno: string: revision number
    username: string: user name who made the revision
    rev_date: string: revision date and time as a string in YYYY/MM/DD HH:MM:SS format
    rev_type: string. One of:
      "create"
      "update"
      "move"
      "delete"
    path_type: string: one of:
      "file"
      "folder"
    path: string: path of the file/folder
    metadata: Dictionary containing any application-specific metadata to be stored with the revision.
    data: BASE64 encoding contents of the revision e.g. the stream of bytes for a file create or update (optional).

An example is shown below (note that multiple lines are used for illustrative purposes but in a real file, each revision is a single line of well formed JSON dictionary syntax:

{
"revno":"10000",
"username":"joe",
"rev_date":"2011/01/18 02:08:18",
"rev_type":"create",
"path_type":"file",
"path": "first_drafts/a.odt","metadata":{"AUTHOR: "Joe","DUE DATE:"ASAP"}
}

The advantages of this are many. It provides a file format for content, corpus and workflow processing. Additionally, it provides a technology neutral format for archiving, dissemination and regulatory reporting. Furthermore, it provides a technology neutral format for backup/restore operations. It provides a technology neutral format for streaming workflow events between digital asset management nodes in a distributed system. By simply including the data payload field, the provenance report is sufficiently detailed that it is possible to re-create the entire corpus, as it looked revision-by-revision.

The corpus management system contains all the provenance information necessary to allow first-order authentication to have meaning in a fully digital environment. Any organization wishing to publish first-order authentic digital records publishes not just the digital records but the complete provenance of those records. The provenance reporting is automatically generated from the change history of the corpus itself. Thus ensuring that there is no possible disconnect between the provenance and the digital records themselves. Any system that purports to be first-order authentic source for X must have identical provenance reports as the original system, X. Any system that does not have identical provenance reports, is then, by definition, just a second order authentic source.

It will be appreciated that the corpus-centric approach of the present teaching, may be applied in a variety of digital content management environments. An exemplary application of the present teaching provides for hypertext links that allows users to traverse links, moving from document to inter-related document via a web browser. Thus the user is always able to view the visited documents as they were at whatever time point set by the user. It is not intended to limit the present teaching to the exemplary application as the present teaching may be applied to other applications. For example, the present teaching may be applied in the following environments which are provided by way of example only, GIS/GeoDatabase application, Time based management of inter-related spreadsheets, Time based management of inter-related word processor documents, etc.

The GIS/GeoDatabase application will now be described by way of example. It is known in the art how to create Geographic Information Systems (GIS) by expressing the inter-relations between different types of geo-spatial data as separate, inter-related files. A typical GeoDatabase involves managing the relationships between file types such as:

A base map

Layer files defining polygons such as school districts, electoral districts etc.

Layer files defining points for places e.g. based on latitude, longitude

Attribute files defining data objects to be associated with points and polygons

Imagery files such as aerial photography, street views etc.

Many existing GIS systems use URL hyper-links to reference the inter-related files. By utilizing the time-based corpus-centric approach of the present teaching, GIS systems and User Interfaces to GIS applications may be configured to facilitate point-in-time retrieval of files. In other words users may be presented with a user interface that allows them to move to any previous time point and see what the GeoDatabase data looked like, across all its inter-related files, at that moment in time.

This is very useful for situations such as records retention, litigation and e-Discovery where it is beneficial to be able to see what the data in the GIS system looked like at the point where some event took place. For example, the road system at the point of occurrence of a traffic accident, the demographic situation at the point when a planning permission decision was made, etc. Advantageously, by utilizing the time-based approach of the present teaching, it is possible to record the point in time reference in transaction records such as accounting systems or work logbooks. Thus it becomes possible, to start from a logbook entry created at time T and then go back to that point in time in the GIS application and see what was present in the GIS application, at time T. Advantageously, by utilizing the time-based approach of the present teaching, it is possible to do geo-spatial trend analysis and regression model creation for predictive analytics, utilizing the change history contained in the detailed log of the actions performed over time on the inter-related files that make up the geodatabase.

The time based management of inter-related spreadsheets will now be described by way of example. It is known in the art how to create complex spreadsheet models of systems in areas such as accounting and financial services by splitting a single large spreadsheet model into a set of inter-related spreadsheet files. By utilizing the time-based corpus-centric approach of the present teaching, spreadsheet models created from inter-related files facilitate point-in-time retrieval. In other words, users may be presented with a user interface that allows them to move to any previous time point and see what the spreadsheet model, consisting of a compete set of inter-related files, looked like at that moment in time.

This is an improvement on the current state of the art as spreadsheets are often used in scenarios where users need to see what was in spreadsheet models at some previous moment in time. For example, a financial officer seeking to view what a spreadsheet model contained at the end of the first quarter in a previous financial year. These models are typically constructed from sets of inter-related spreadsheets. For example:

gross_revenues.xlsx
revenue_region_a.xlsx
revenue_region_b.xlsx
revenue_region_c.xlsx
revenue_region_d.xlsx In the example, there are five inter-related, inter-linked spreadsheet files. Having access to the top level file gross_revenues.xlsx as it was at the end of the first quarter of the previous financial year, is not enough to see the full model because the formulae in that spreadsheet depend on data/formulae in the four inter-related spreadsheets for the regions a to d, shown above. By utilizing the time-based corpus-centric approach of the present invention, the user can be sure of seeing the entire spreadsheet model i.e. all five inter-related spreadsheet files as they were at any chosen historic time point. Advantageously, by utilizing the time-based approach of the present invention, it is possible to do trend analysis and regression model creation for predictive analytics, utilizing the change history contained in the detailed log of the actions performed over time on the inter-related spreadsheet files that make up the spreadsheet models.

The time based management of inter-related word processing documents will now be described by way of example. It is known in the art how to create complex digital documents such as contracts, insurance policies, technical manuals by splitting single large documents into a set of inter-related documents in what are known as master/slave arrangements. Typically such documents are published as single objects and versioned as single objects. For example:

jones_contract_v1.doc
standard_clauses.doc
clause_a.doc
clause_b.doc
clause_c.doc In the example, five separate documents are edited independently but published via an assembly process in which each of the slave documents is "pulled in" to the master file. A common publishing format is PDF. The PDF of the above scenario might appear as jones_contract_v1.pdf, but it will contain all the content from the four slave documents as they were at the moment the master file was updated. By utilizing the time-based corpus-centric approach of the present teaching, master/slave documents can be made time-ware. In other words a user may be presented with a user interface that allows them to move to any previous time point and see what the complete set of master/slave documents looked like at that moment in time. This is an improvement on the current state of the art as master/slave documents are often used in scenarios where users need to see what was in the complete document set at some previous moment in time. By utilizing the time-based corpus-centric approach of the present teaching, the user is able see the entire document material i.e. all five inter-related document files as they were at any chosen historic time point.

An example of a corpus snapshot URLs for third party application integration will now be described. Advantageously, the time-based approach of the present teaching, allows the user to create a "snapshot URL" which serves as a short identifier, that may be used to access and navigate the entire corpus at the time-point specified in the URL. Advantageously, these short identifiers can be added into third party applications such as e-mails, accounting systems, logbooks, transaction databases, spreadsheets etc. to effectively "snapshot" what a corpus of information looked like at any given point in time. For example, consider a financial trading situation where a trade is made under a regime of rules, regulations, guidelines that change on a regular basis. Utilizing the corpus snapshot URIs of the present teaching, traders can record the entire state of the rules, regulations and guidelines as they existed at the moment the trade was made. It will be appreciated that this has significant applications both for internal record keeping, management accounting, litigation support and external audits.

Another example would be a treasury function in a private sector business or in a government. Disbursements are made under a regime of rules, regulations, guidelines that change on a regular basis. Utilizing the corpus snapshot URLs of the present invention, it is easy to record the entire state of the rules, regulations and guidelines as they existed at the moment the disbursement was made. It will be appreciated that this has significant applications for public sector record keeping, transparency, litigation support, legislative oversight and external audits.

A further example would be a hospital environment in which data from a variety of applications ranging from laboratories to patient monitoring needs to be aware of a complex set of policies, rules and regulations which change over time. With the present teaching it is possible in a hospital environment to store snapshot URLs to a complete corpus of data as it stood at any moment in time. The snapshot URL can cover content directly relating to individual patients and to rules/regulations/policies as desired.

It will be appreciated that this has significant applications for risk management, litigation support, compliance and external audits.

An example of how the present teaching may be applied in a time-based repository will now be described. It is known in the art how to organize digital content into a folder structure so that users interact with content using well established digital metaphors for paper files and paper/cabinet folders. Such repositories are generally known as "file systems". It is known how to create file systems from a variety of network digital storage devices using open APIs such as AtomPub (The Atom Publishing Protocol), SAMBA and NTFS (New Technology File System). It will be appreciated that the point in time-based aspects of the present teaching may be used to implement a point in time file system. Advantageously, the end-user experience of these point-in-time file systems is indistinguishable from any other file system and will seamlessly integrate into all existing applications such as:
  desktop managers
  file managers
  word processor master/slave files
  spreadsheets, including inter-related sets of spreadsheets, connected via
  spreadsheet links Advantageously, by exposing a read-only file-system based on any chosen point in time, users can be presented with a standard read-only file-system that allows them to see a set of inter-related files as they appeared at that particular point in time. Thus for example, a master spreadsheet and its linked child spreadsheets can be known to be consistent with each other as they will all be reflective of the time-point used to create the read-only file system. Advantageously, by exposing a read-write file system, the present teaching may be made to behave like a normal file system and yet, internally, it keeps complete point-in-time track of all the inter-related files that make up the content of the file system. Advantageously, applications that support inter-related files but are not natively time-ware such as spreadsheets, GIS editing tools (e.g. layers of data), word-processors (master/slave files), RuleBase systems, can be made time-ware without any modifications to the applications themselves. As long as the applications know how to persist their data to a standard file-system, they can be made time-aware using the present teaching.

An example of how the present teaching may be applied in a web application will now be described. It will be appreciated that the present teaching allows point-in-time access to any digital byte-stream as it looked at a particular moment in time. Advantageously, this includes byte-streams for software as well as for data. For example, consider a web application consisting of:
  html pages
  pdf pages
  javascript application logic The point-in-time capabilities of the present teaching may be applied to all three data types above. It follows that the rendering and the interactive behavior of the website can be managed under the same point-in-time versioning regime as all the inter-related data files. In other words, not only is it possible using the present teaching to view all the data in a system as it was at a given historical time point, it is also possible to view the data using the website application logic, as it also looked at that same historical time point. For example: 1 January: Application Launches with data files X, Y, Z and Javascript logic files A,B,C
  1 February: Data file X changes to X1
  1 March: Data file Y changes to Y1
  1 April: Application logic file A changes to A1
  1 May: Data file Z changes to Z1
  1 August: Current point in time In this example, the data corpus changes three times between January and May while the application logic changes twice over the same time period. If the data corpus is managed under the point-in-time paradigm of the present teaching, but the application logic is not, then the user who goes back in time from 1 August to 1 March will see the data using the web application logic as it was at 1 August i.e. including the changes made on April 1. If both the data corpus and the application logic are managed under the point-in-time paradigm of the present teaching, then the user who goes back in time from 1 August to 1 March will see the data using the web application logic as it was at 1 March i.e. exactly the same application logic that was being used on 1 March. Advantageously, this allows applications to be built which not only preserve all data as it was at each previous point in time, but also preserves rendering and interactive behaviors of applications such as websites, as they were at each previous point in time. It will be appreciated that the more dynamic behavior is used in a website, the more valuable it becomes to be able to go back in time and see the data at some historic time T, as it would have looked, rendered with the application logic as it also looked at time T.

Figure 5:
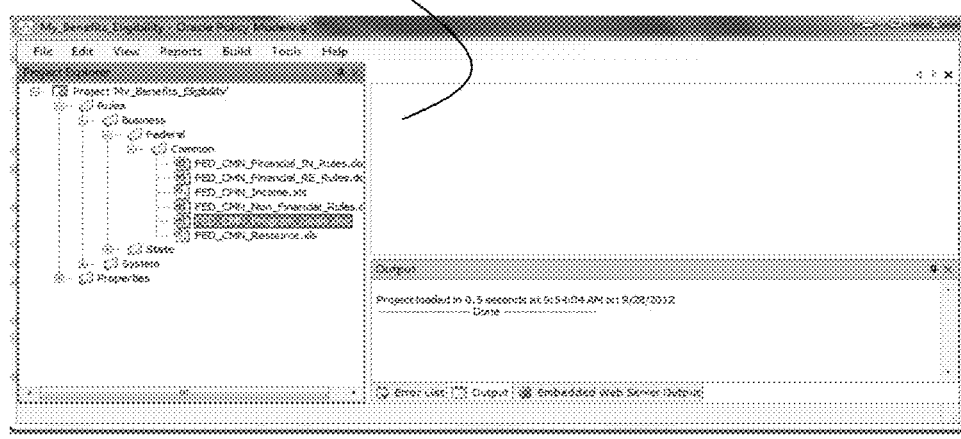
FIG. 5 is a detail of a data repository in accordance with the present teaching.
Figure 6:
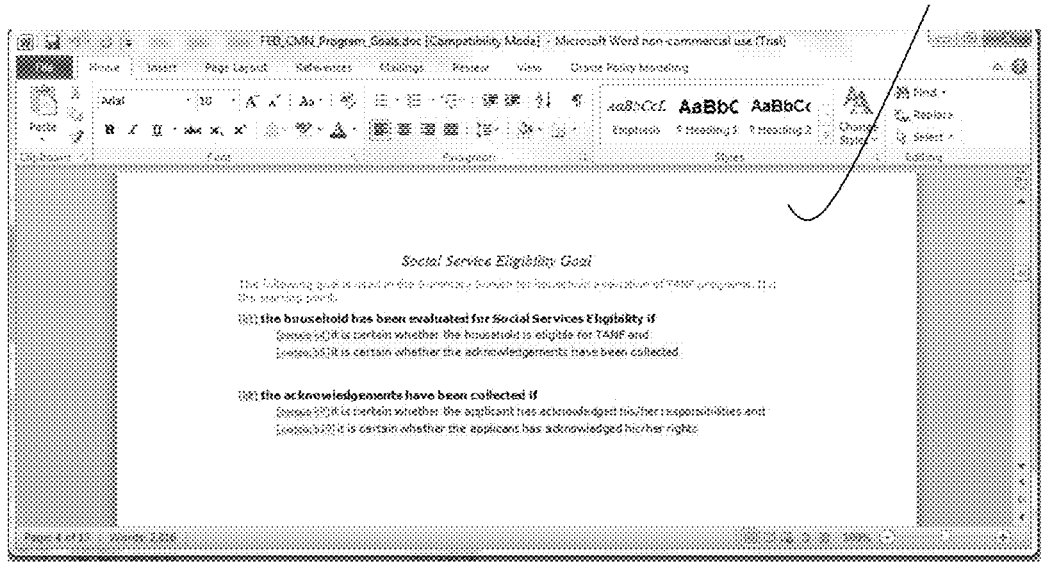
FIG. 6 is a detail of the data repository of FIG. 5.
Figure 7:
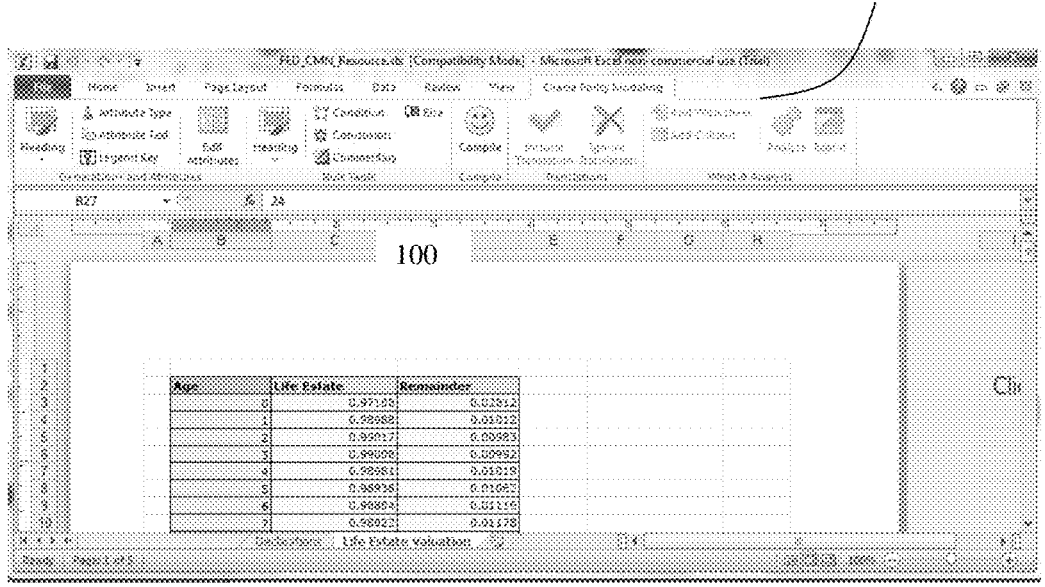
FIG. 7 is a detail of the data repository of FIG. 5.
Figure 8:
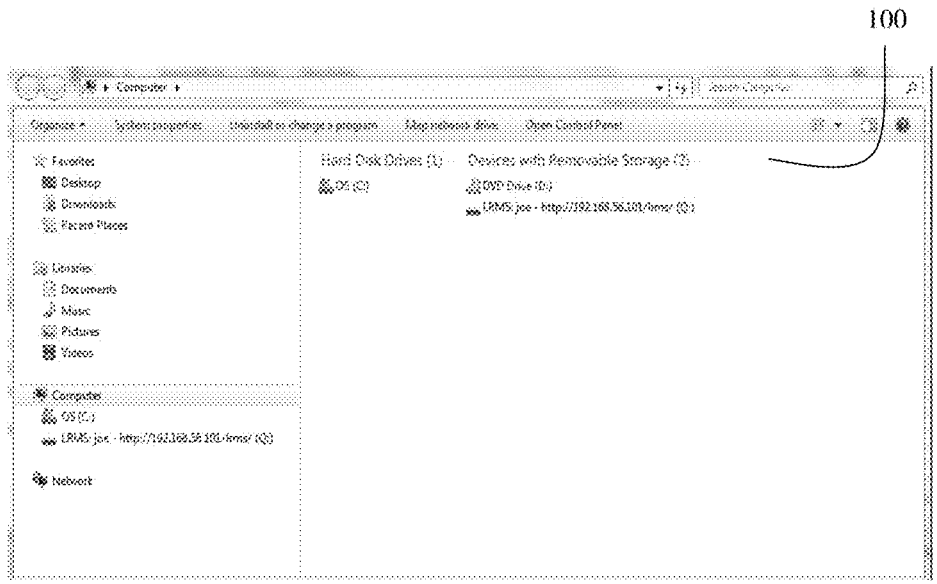
FIG. 8 is a detail of the data repository of FIG. 5.
Figure 9:
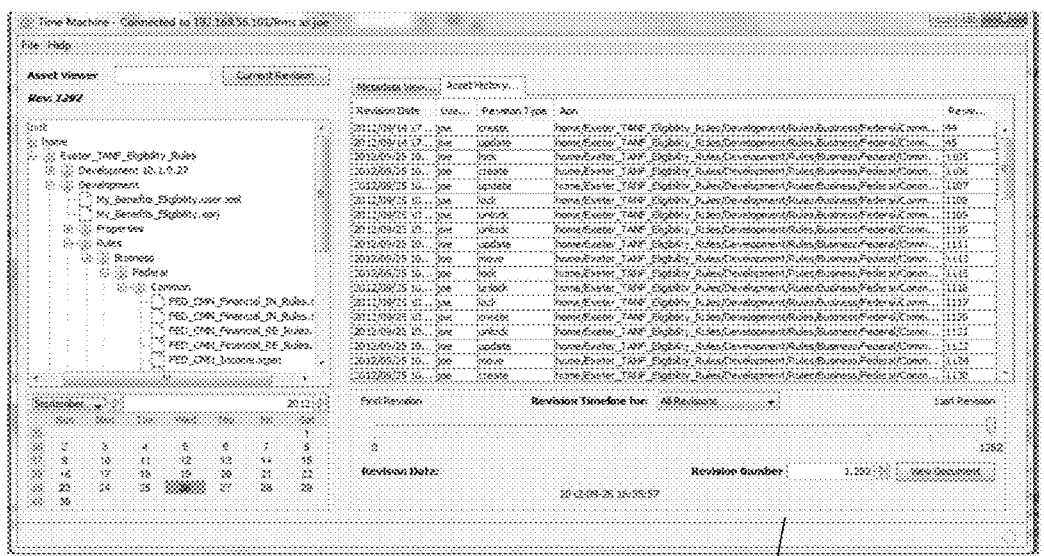
FIG. 9 is a detail of the data repository of FIG. 5.
Figure 10:
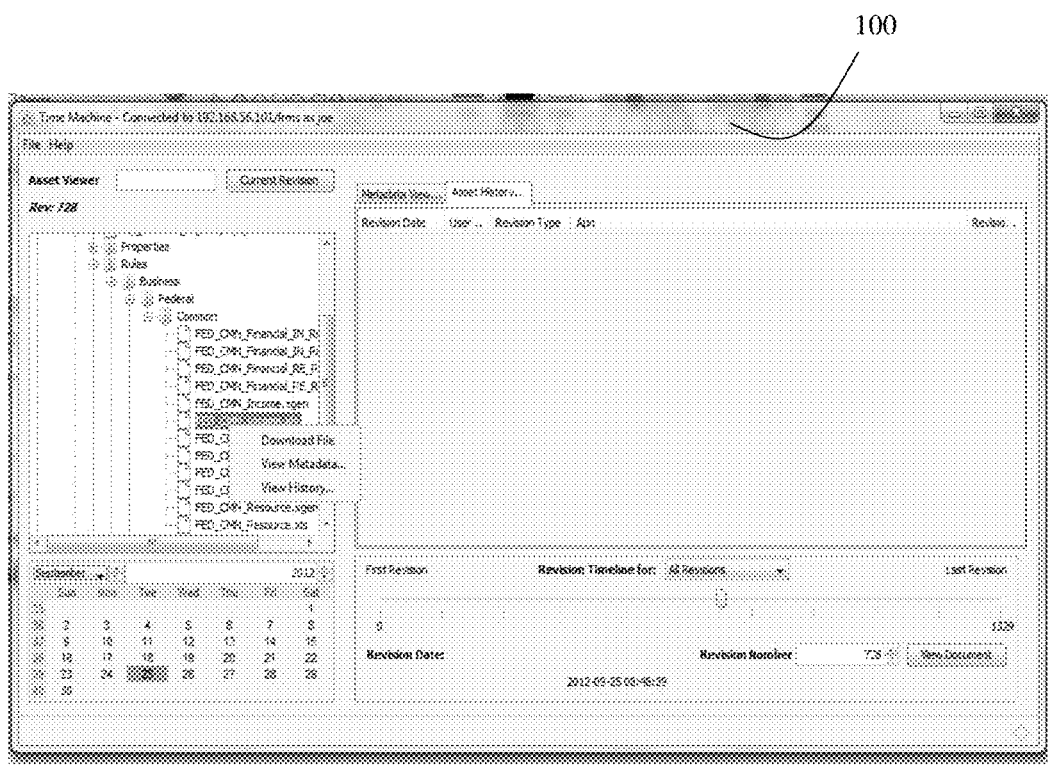
FIG. 10 is a detail of the data repository of FIG. 5.
Figure 11:
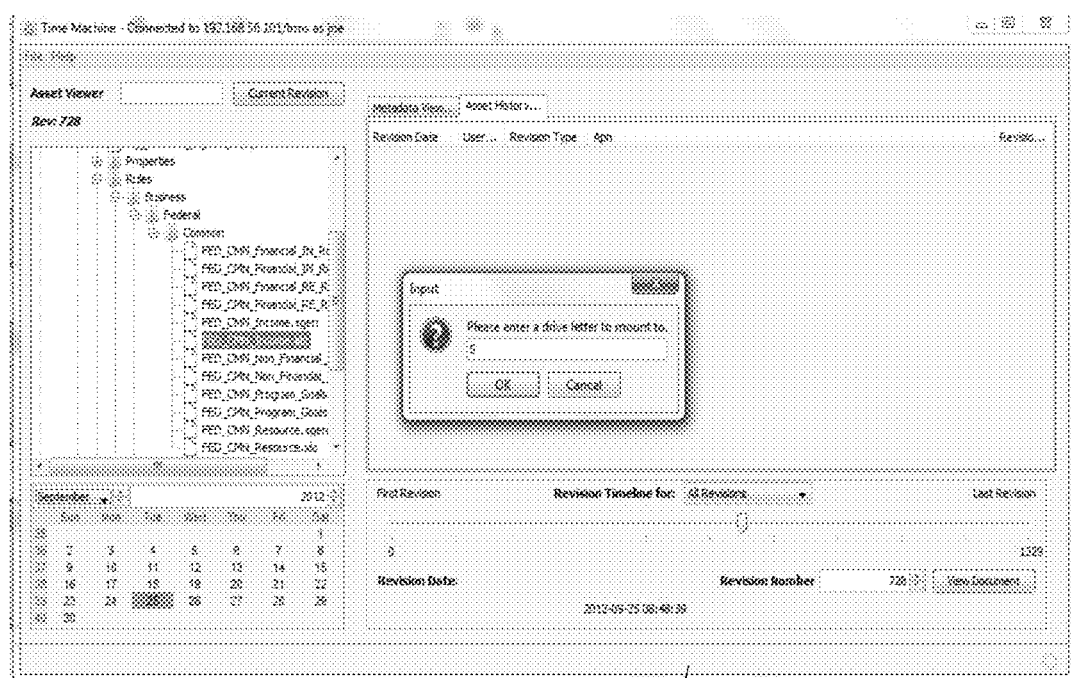
FIG. 11 is a detail of the data repository of FIG. 5.
Figure 12:
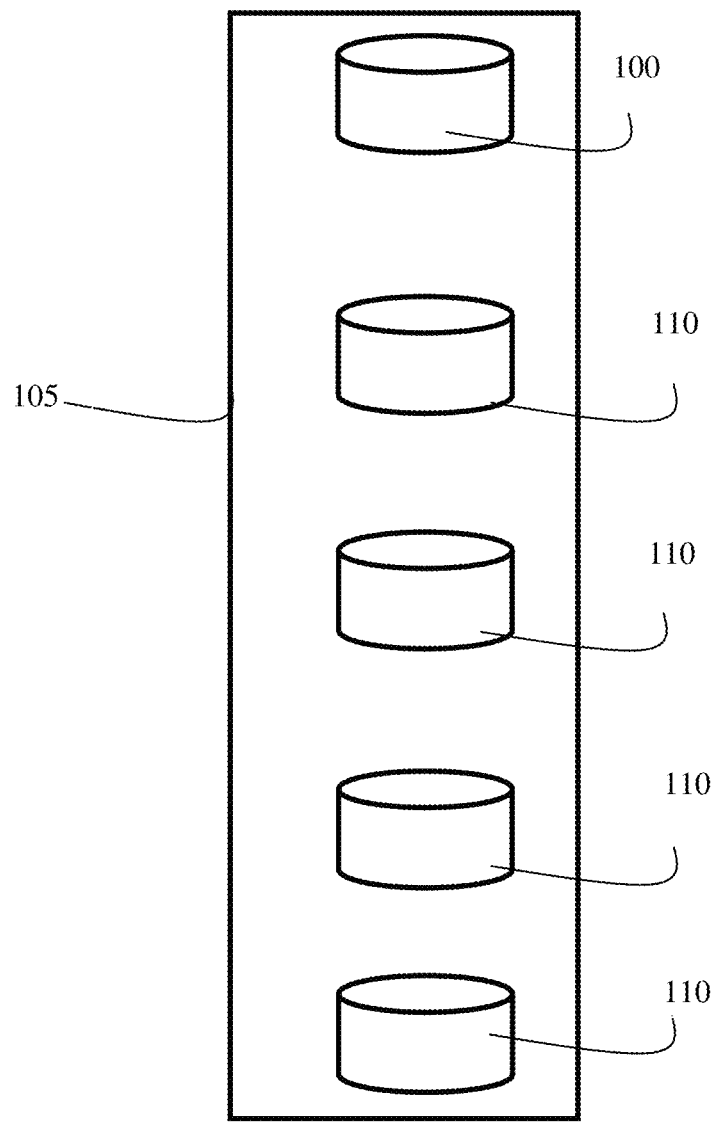
FIG. 12 is a block diagram of an exemplary system on which the data repository of FIG. 5 resides.

An exemplary application of the data repository 100 in operation will now be described with reference to FIGS. 5 to 12. The data repository 100 is stored on a server 105 as illustrated in FIG. 12. The server 105 uses a Microsoft Windows file-system which is well known to those skilled in the art. All Windows applications that can read/write files and navigate folder structures may be used with the data repository 100 of the present invention. The benefit of this is that any existing Windows application becomes "time-aware" without any change being necessary to the application itself. Note that although Windows is used here as an example, the same is true for any other operating system or Cloud platform e.g. Linux, NTFS, DropBox, WebDav etc. FIG. 5 illustrates a graphical user interface of the digital archive 100 which includes Microsoft Word and Microsoft Excel files that can be edited in the normal way. FIG. 6 illustrates an exemplary Microsoft Word file; and FIG. 7 illustrates an exemplary Microsoft Excel file which are incorporated into the data repository 100. The data repository 100 may be hosted on a network drive as illustrated in FIG. 8. By using the time-aware features of the present teaching it is possible to move to any previous point in time and view what the entire record of word/excel files looked like at that moment in time as illustrated in FIG. 9. It will be appreciated that each time that an action is implemented on any of the word or excel files, the data repository 100 containing these files is versioned thereby creating versioned data repository 110 as illustrated in FIG. 12. Each versioned data repository 110 is assigned an associated version identifier which is time stamped for facilitating future retrieval thereof. Discrete files may be downloaded from the server 105, as they looked at any given point in time as illustrated in FIG. 10. A read-only file-system can also be created that shows what all the files in the server 105 looked like at a point in time. For example, in FIG. 11 a new read-only network drive S is created showing the complete archive as it was 25/09 of 2012 at 8:48 a.m. The complete archive includes the original data repository 100 and all the versioned repositories 110.

The present system provides detailed provenance reports which may act as technology independent yet machine readable backups. These can be restored into nodes that may be based on completely different technology substrates. This allows compliant systems to change as technology changes yet carry forward the provenance as well as the content of digital assets from one technology generation to the next.

It will be understood that what has been described herein is an exemplary data repository having interrelated digital data files. While the present application has been described with reference to exemplary arrangements it will be understood that it is not intended to limit the teaching of the present disclosure to such arrangements as modifications can be made without departing from the spirit and scope of the application. It will be appreciated that for simplicity and clarity of illustration, where considered appropriate, reference numerals may be repeated among the figures to indicate corresponding or analogous elements. It will be understood that while exemplary features of a system and methodology in accordance with the teaching of the invention have been described that such an arrangement is not to be construed as limiting the invention to such features.

A method of and a system for generating a data repository in accordance with the present teaching can be implemented in software, firmware, hardware, or a combination thereof. In one mode, a method of and a system for generating a data repository is implemented in software, as an executable program, and is executed by one or more special or general purpose digital computer(s), such as a personal computer (PC; IBM-compatible, Apple-compatible, or otherwise), personal digital assistant, workstation, minicomputer, or mainframe computer. Servers or client devices or any computing means may be provided for generating the digital data record. The server or client device may include one or more processors and may include a distributed architecture with multiple nodes. It will be appreciated that the claimed method may be implemented on a cloud computing platform having a distributed network of nodes. The nodes may include one or more processing units as will be appreciated by those of ordinary skill in the art.

Generally, in terms of hardware architecture, such a computer will include, as will be well understood by the person skilled in the art, a processor, memory, and one or more input and/or output (I/O) devices (or peripherals) that are communicatively coupled via a local interface. The local interface can be, for example, but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the other computer components.

The processor(s) residing on the server 105 may be programmed to perform the functions of the workflow of FIG. 4 for example. The processor(s) is a hardware device for executing software, particularly software stored in memory. Processor(s) can be any custom made or commercially available processor, a central processing unit (CPU), an auxiliary processor among several processors associated with a computer, a semiconductor based microprocessor (in the form of a microchip or chip set), a macroprocessor, or generally any device for executing software instructions. Examples of suitable commercially available microprocessors are as follows: a PA-RISC series microprocessor from Hewlett-Packard Company, an 80×86 or Pentium series microprocessor from Intel Corporation, a PowerPC microprocessor from IBM, a Sparc microprocessor, Inc. Client device 100 may also represent a distributed processing architecture such as, but not limited to, SQL, Smalltalk, APL, Erlang, Scala, Hadoop, BigTable, Amazon EC2, Microsoft Azure, NoSQL databases and Cloud Computing. It will be appreciated that the system may implemented on a distributed processing architecture.

Memory is associated with processor(s) and is operable to receive data. Memory can include any one or a combination of volatile memory elements (e.g., random access memory (RAM, such as DRAM, SRAM, SDRAM, etc.) and non-volatile memory elements (e.g., ROM, hard drive, tape, CDROM, etc.). Moreover, memory may incorporate electronic, magnetic, optical, and/or other types of storage media. Memory can have a distributed architecture where various components are situated remote from one another, but are still accessed by processor(s).

The software in memory may include one or more separate programs. The separate programs comprise ordered listings of executable instructions for implementing logical functions of the workflow. In the example heretofore described, the software in memory includes one or more components of the method of and a system of the present teaching and is executable on a suitable operating system (O/S). A non-exhaustive list of examples of suitable commercially available operating systems is as follows: (a) a Windows operating system available from Microsoft Corporation; (b) an Apple iOS available from Apple Computer, Inc; (c) a Macintosh operating system available from Apple Computer, Inc.; (d) a UNIX operating system, which is available for purchase from many vendors, such as the Hewlett-Packard Company, Oracle Inc.; (e) a LINUX operating system, which is freeware that is readily available on the Internet; (f) a run time Vxworks operating system from WindRiver Systems, Inc.; or (g) an appliance-based operating system, such as that implemented in handheld computers, tablets or personal digital assistants (PDAs) (e.g. Apple iOS, Android, Roku). The operating system essentially controls the execution of other computer programs, such as that provided by the present teaching, and provides scheduling, input-output control, file and data management, memory management, and communication control and related services.

The system provided in accordance with the present teaching may include components provided as a source program, executable program (object code), script, or any other entity comprising a set of instructions to be performed. When a source program, the program needs to be translated via a compiler, assembler, interpreter, or the like, which may or may not be included within the memory, so as to operate properly in connection with the O/S. Furthermore, a methodology implemented according to the teaching may be expressed as (a) an object oriented programming language, which has classes of data and methods, or (b) a procedural programming language, which has routines, subroutines, and/or functions, for example but not limited to, C, C++, Pascal, Basic, Fortran, Cobol, Perl, Java, and Ada.

The I/O devices and components of the client device may include input devices, for example but not limited to, input modules for PLCs, a keyboard, mouse, scanner, microphone, touch screens, interfaces for various medical devices, bar code readers, stylus, laser readers, radio-frequency device readers, etc. Furthermore, the I/O devices may also include output devices, for example but not limited to, output modules for PLCs, a printer, bar code printers, displays, etc. Finally, the I/O devices may further include devices that communicate both inputs and outputs, for instance but not limited to, a modulator/demodulator (modem; for accessing another device, system, or network), a radio frequency (RF) or other transceiver, a telephonic interface, a bridge, and a router.

When the method of and system of the present teaching is implemented in software, it should be noted that such software can be stored on any computer readable medium for use by or in connection with any computer related system or method. In the context of this document, a computer readable medium is an electronic, magnetic, optical, or other physical device or means that can contain or store a computer program for use by or in connection with a computer related system or method. Such an arrangement can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), Digital Video Disc (DVD), Universal Serial Bus (USB) and a portable compact disc read-only memory (CDROM) (optical). Note that the computer-readable medium could even be paper or another suitable medium upon which the program is printed, as the program can be electronically captured, via, for instance, optical scanning of the paper or other medium, then compiled, interpreted or otherwise processed in a suitable manner if necessary, and then stored in a computer memory.

Any process descriptions in the accompanying Figures, should be understood as representing modules, segments, or portions of code which include one or more executable instructions for implementing specific logical functions or steps in the process/workflow, and alternate implementations are included within the scope of the embodiments of the present teaching in which functions may be executed out of order from that shown or discussed, including substantially concurrently or in reverse order, depending on the functionality involved, as would be understood by those having ordinary skill in the art.

It should be emphasized that the above-described embodiments of the present teaching, particularly, any "preferred" embodiments, are possible examples of implementations, merely set forth for a clear understanding of the principles. Many variations and modifications may be made to the above-described embodiment(s) without substantially departing from the spirit and principles of the invention. All such modifications are intended to be included herein within the scope of this disclosure and the present invention and protected by the following claims.

Although certain example methods, apparatus, systems and articles of manufacture have been described herein, the scope of coverage of this application is not limited thereto. On the contrary, this application covers all methods, systems, apparatus and articles of manufacture fairly falling within the scope of the appended claims.

The words comprises/comprising when used in this specification are to specify the presence of stated features, integers, steps or components but does not preclude the presence or addition of one or more other features, integers, steps, components or groups thereof.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the present invention.

At least the following is claimed:

1. A data repository configured for storing original content and modified content, the original and modified content being addressable for facilitating point-in-time retrieval thereof; the data repository comprising:
   a first corpus defined by two or more digital files which are associated with the original content, the two or more digital files being inter-related to one another at a first point of time, the first corpus including hypertext links that allow users to traverse links, moving from one digital file at the first point of time to another inter-related digital file at the same first point of time is a web browser, the first corpus defining a snapshot of the two or more digital files as they existed at the first point in time;
   a log detailing actions implemented on the two or more of the digital files;
   a second corpus defined by two or more digital files which are associated with the original content, the two or more digital files being inter-related to one another at a second point of time, the second corpus being defined by a versioned repository generated after an action is implemented on the one of the two or more digital files of the first corpus, wherein the versioned repository includes an updated version of the entire first corpus at the second point in time, the updated version including one or more digital files which are associated with the modified content and hypertext links that allows users to traverse links, moving from one digital file at the second point of time to another inter-related digital file at the second point of time via a web browser, the second corpus defining a snapshot of the two or more digital files as they existed at the second point in time; and a point of time version identifier defining a revision number associated with each corps such that the first corpus is defined by a first revision number and the second corpus defined by a second different revision number, each revision number providing a point in time identifier and retrieval point of the totality of digital files defined by each of the first corpus and the second corpus respectively, and further;

wherein the data repository is configured to use the revision number for each of the first and second corpus in combination with the hypertext links within each of the first corpus and the second corpus to constrain a user traversal of the hyperlinks defined within each of the first corpus and the second corpus to those documents that are defined wholly within the first corpus and the second corpus respectively.

2. A repository as claimed in claim 1, wherein the log includes time data.

3. A data repository as claimed in claim 1, wherein the log includes a timeline.

4. A data repository as claimed in claim 1, wherein the log includes biographic data of an editor.

5. A data repository as claimed 4, wherein the log includes biographic data of a plurality of editors.

6. A data repository as claimed in claim 5, wherein the biographic data includes at least one of a name, title, professional qualification, role and address.

7. A data repository as claimed in claim 1, wherein the log is tabulated.

8. A data repository as claimed in claim 1, wherein the repository is part of a geographic information software application.

9. A data repository as claimed in claim 8, wherein the two or more digital files include a base map and a plurality of associate digital files.

10. A data repository as claimed in claim 1, wherein the repository is part of an accounting software application.

11. A data repository as claimed in claim 10, wherein the two or more digital files include a plurality of inter-related spreadsheets.

12. A data repository as claimed in claim 1, wherein the repository is part of a word processing software application.

13. A data repository as claimed in claim 1, wherein the two or more digital files comprises a plurality of inter-related word processor documents.

14. A data repository as claimed in claim 1, wherein the versioned repository has an associated time stamp.

15. A data repository as claimed in claim 1, wherein the repository forms part of a web application.

16. A data repository as claimed in claim 1; wherein the repository is in a format suitable for publishing on the internet.

17. A data repository as claimed in claim 1, wherein the versioned repository has an associated hyperlink address for facilitating retrieval thereof via the internet.

18. A data repository as claimed in claim 1, further comprising metadata.

19. A data repository as claimed in claim 1, wherein the actions includes at least one of updating, deleting, editing, and creating.

20. A data repository as claimed in claim 8, configured for facilitating a geo-spatial trend analysis and regression model creation utilizing a change history contained in the log.

21. An article of manufacture, comprising: a non-transitory computer readable storage medium having machine readable instructions embodied thereon which, when executed by a processor, cause the processor to provide a data repository comprising:

a first corpus defined by two or more digital files with associated content, the two or more digital files being inter-related to one another at a first point in time, the first corpus including hypertext links that allow users to traverse links, moving from one digital file at the first point of time to another inter-related digital file at the same first point of time via a web browser, the first corpus defining a snapshot of the two or more digital files as they existed at the first point in time;

a log detailing actions implemented on at least one of the two or more of the digital files;

a second corpus defined by two or more digital files which are associated with the original content, the two or more digital files being inter-related to one another at a second point of time, the second corpus being a versioned repository being generated after an action is implemented on the at least one of the two or more digital files of the first corpus; the versioned repository comprising an updated version of the entire first corpus at the second point in time, the updated version including one or more modified digital files which are associated with modified content and hypertext links that allows users to traverse links, moving from one digital file at the second point in time to another inter-related digital file at the second point in time via a web browser, the second corpus defining a snapshot of the two or more digital files as they existed at the second point in time; and a version identifier being associated with the versioned repository for facilitating point in time retrieval thereof, wherein the versioned repository comprises revision numbers allocated to each corpus as opposed to revision numbers allocated to individual files of each of the corpus so as to allow a user view the totality of individual digital files within each corpus as they were at whatever time point is set by the user, and further wherein the machine-readable instructions are configured to cause the processor to use the revision number for each of the first and second corpus in combination with the hypertext links within each of the first corpus and the second corpus to constrain a user traversal of the hyperlinks defined within each of the first corpus and the second corpus to those documents that are defined wholly within the first corpus and the second corpus respectively.

22. A method of creating a data repository the method comprising:

providing a first corpus defied by two or more digital files with associated content, the two or more digital files being inter-related to one another at a first point of time, the first corpus including hypertext links that allow users to traverse links, moving from one digital file at the first point of time to another inter-related digital file at the same first point of time via a web browser, the first corpus defining a snapshot of the two or more digital files as they existed at the first point in time;

providing a log detailing actions implemented on at least one of the two or more of the digital files;

providing a second corpus defined by two or more digital files which are associated with the original content, the two or more digital files being inter-related to one another at a second point of time, the second corpus being defined by generating a versioned repository when an action is implemented on at least one of the two or more digital files of the first corpus; the versioned repository comprising an updated version of the entire first corpus at the second point in time, the updated version including one or more modified digital files which are associated with modified content and hypertext links that allows users to traverse links, moving from one digital file at the second point in time to another inter-related digital file at the second point in time via a web browser, the second corpus defining a snapshot of the two or more digital files as they existed at the second point in time;

providing a point in time version identifier being associated with the versioned repository for facilitating point in time retrieval thereof wherein the versioned repository comprises revision numbers allocated each corpus as opposed to revision numbers allocated to individual files of each of the corpus so as to allow a user view the totality of the individual digital files within each corpus as they were at whatever time point is set by the user;

storing the versioned repository; and using the revision number for each of the first and second corpus in combination with the hypertext links within each of the first corpus and the second corpus to constrain a user traversal of the hyperlinks defined within each of the first corpus and the second corpus to those documents that are defined wholly within the first corpus and the second corpus respectively.

23. A data repository as claimed in claim 1, in which the one or more digital files comprise associated application logic and where the application logic is also stored so that the versioned repository is viewed for the time set by the user, it will appear as it would have looked, rendered with the application logic as it also looked at that time.

* * * * *